United States Patent [19]
Stevenson et al.

[11] Patent Number: 5,879,258
[45] Date of Patent: Mar. 9, 1999

[54] HYDRAULIC CONTROL HAVING A SHIFT CONTROL VALVE FOR A POWER TRANSMISSION

[75] Inventors: Paul Dwight Stevenson, Ann Arbor, Mich.; Melissa Mei Koenig, Obernai, France

[73] Assignee: General Motors Corporation, Detroit, Mich.

[21] Appl. No.: 934,423

[22] Filed: Sep. 19, 1997

[51] Int. Cl.⁶ .................................................. F16H 61/26
[52] U.S. Cl. ......................... 475/135; 475/131; 475/134
[58] Field of Search ................................... 475/135, 131, 475/134, 116, 121; 137/625.17, 625.69

[56] References Cited

U.S. PATENT DOCUMENTS

| | | | |
|---|---|---|---|
| 4,326,433 | 4/1982 | Black et al. ........................ | 475/135 X |
| 4,603,603 | 8/1986 | Salmon ............................. | 475/135 X |
| 4,754,666 | 7/1988 | Inagaki ............................. | 475/131 |
| 4,779,512 | 10/1988 | Leonard ............................ | 137/625.69 |
| 5,046,999 | 9/1991 | Liu et al. ........................... | 475/281 |
| 5,113,725 | 5/1992 | Tomomatsu et al. ............... | 475/116 X |
| 5,378,207 | 1/1995 | Stevenson ......................... | 475/135 |
| 5,454,764 | 10/1995 | Koenig et al. ..................... | 475/131 |
| 5,545,099 | 8/1996 | Jang ................................. | 475/135 |

*Primary Examiner*—Dirk Wright
*Assistant Examiner*—Peter T. Kwon
*Attorney, Agent, or Firm*—Michael J. Bridges; Donald F. Scherer

[57] ABSTRACT

A shift control valve has a valve body in which is rotatably disposed a flow directing plate. Pressurized "drive" fluid is supplied to a control passage in the plate. The control passage communicates with a plurality of radial passages extending therefrom. Circumferential and axial passages communicating with the radial passages selectively direct fluid flow, through the valve body, from the control feed passage to friction device control passages to establish the engagement of friction devices. A plurality of exhaust passages control fluid flow for the disengagement of the friction devices. Supplemental axial feed passages are available to supply fluid pressure for the friction devices during selected ratios other than "drive".

3 Claims, 3 Drawing Sheets

5,879,258

HYDRAULIC CONTROL HAVING A SHIFT CONTROL VALVE FOR A POWER TRANSMISSION

TECHNICAL FIELD

This invention relates to shift control valves for automatic shifting power transmissions.

BACKGROUND OF THE INVENTION

Automatic shifting planetary gear power transmissions have a control valve system that includes shift control valves for controlling the interchange of friction devices (clutches and brakes) which establish the power flow paths in planetary gearing.

The valve system includes a valve body in which the control valves are slidably disposed for linear movement in a longitudinal direction. Generally, each shift valve controls the interchange of two friction devices, or in some instances, a single friction device.

If the transmission has five speed ratios, four shift valves are required. This requires the valve body to be sufficiently large to accommodate the four shift valves plus the other required valving. The valve body must also contain the fluid passages ("worm tracks") that interconnect the shift valves with the proper friction devices and with the proper pressure sources.

SUMMARY OF THE INVENTION

It is an object of the present invention to provide an improved transmission shift control valve mechanism.

In one aspect of this invention, a rotary valve element is disposed in a valve body. The element and body have porting formed therein, such that rotation of the element within the body results in the directing of pressurized fluid to the appropriate transmission friction devices.

In another aspect of this invention, the rotation of the valve element from one position to another results in a ratio interchange within the transmission.

In a further aspect of this invention, a hydraulic control directs pressurized fluid to the valve body in accordance with an operator selection of a desired drive range.

In yet a further aspect of this invention, the valve body includes porting to accept fluid pressure from the hydraulic control when drive selections are made by the operator to permit the porting of oil to selected friction devices.

DESCRIPTION OF AN EXEMPLARY EMBODIMENT

Figure 1:
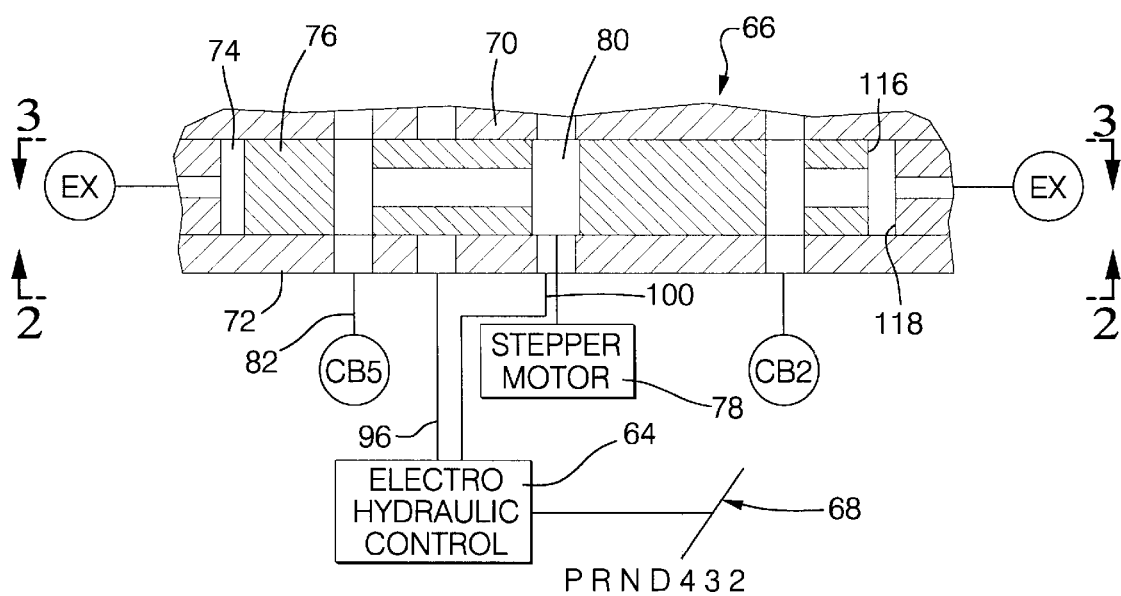
FIG. 1 is a cross-sectional view in schematic representation of a hydraulic control system incorporating the present invention.
Figure 2:
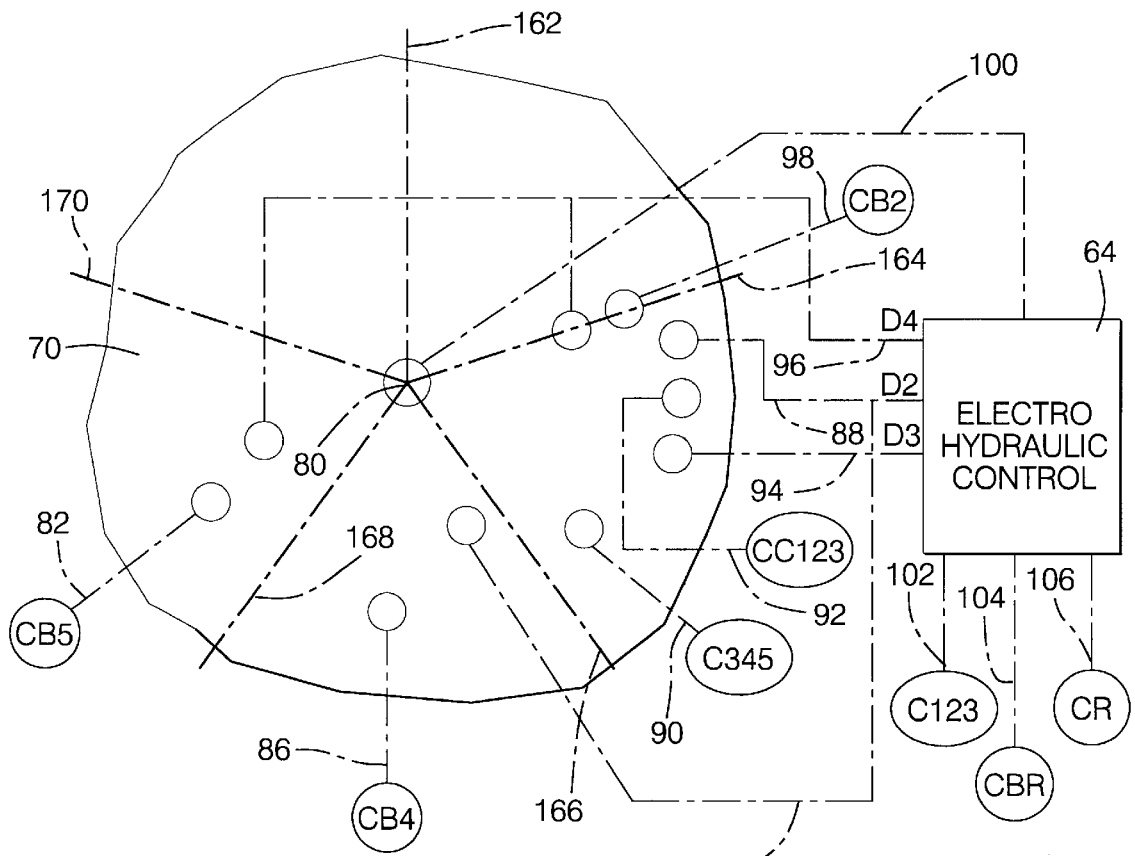
FIG. 2 is a view taken along line 2—2 of FIG. 1.
Figure 3:
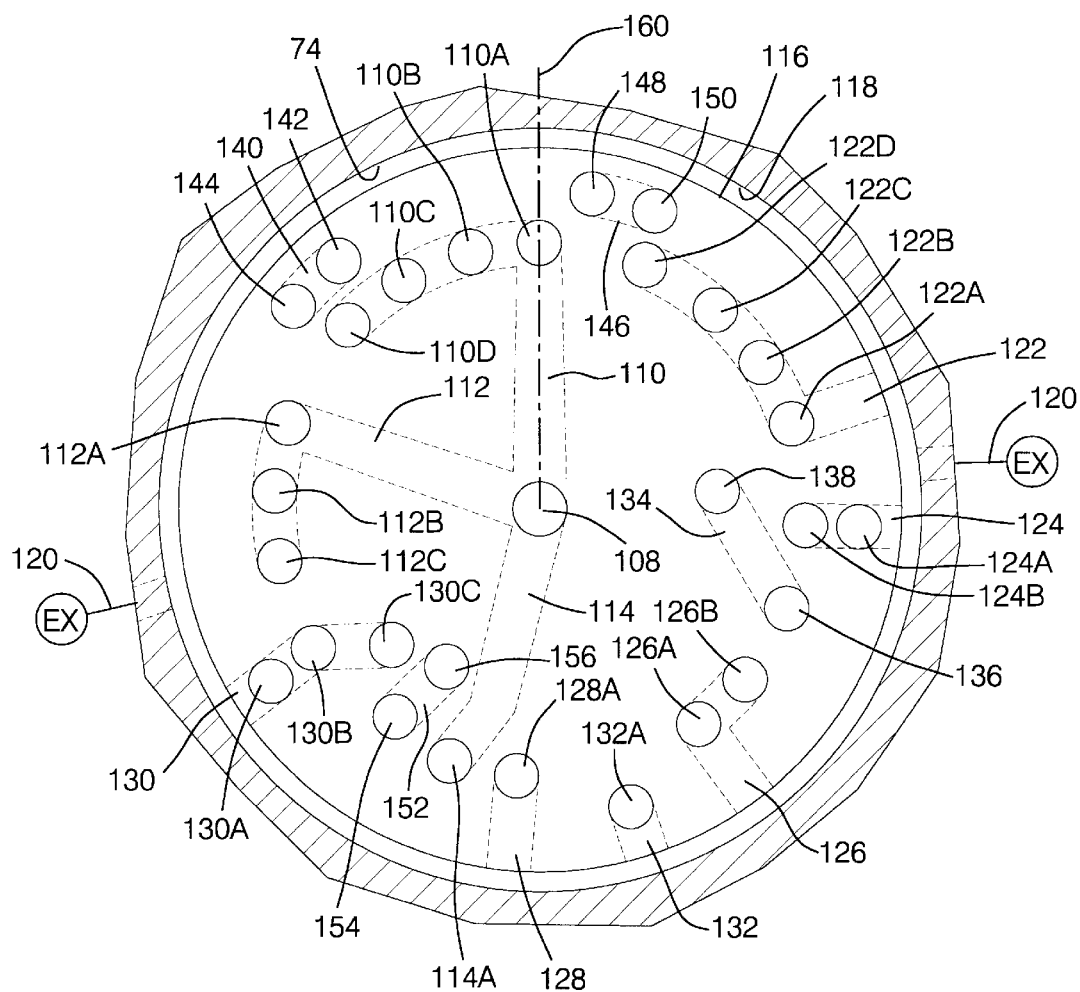
FIG. 3 is a view taken along line 3—3 of FIG. 1.
Figure 4:
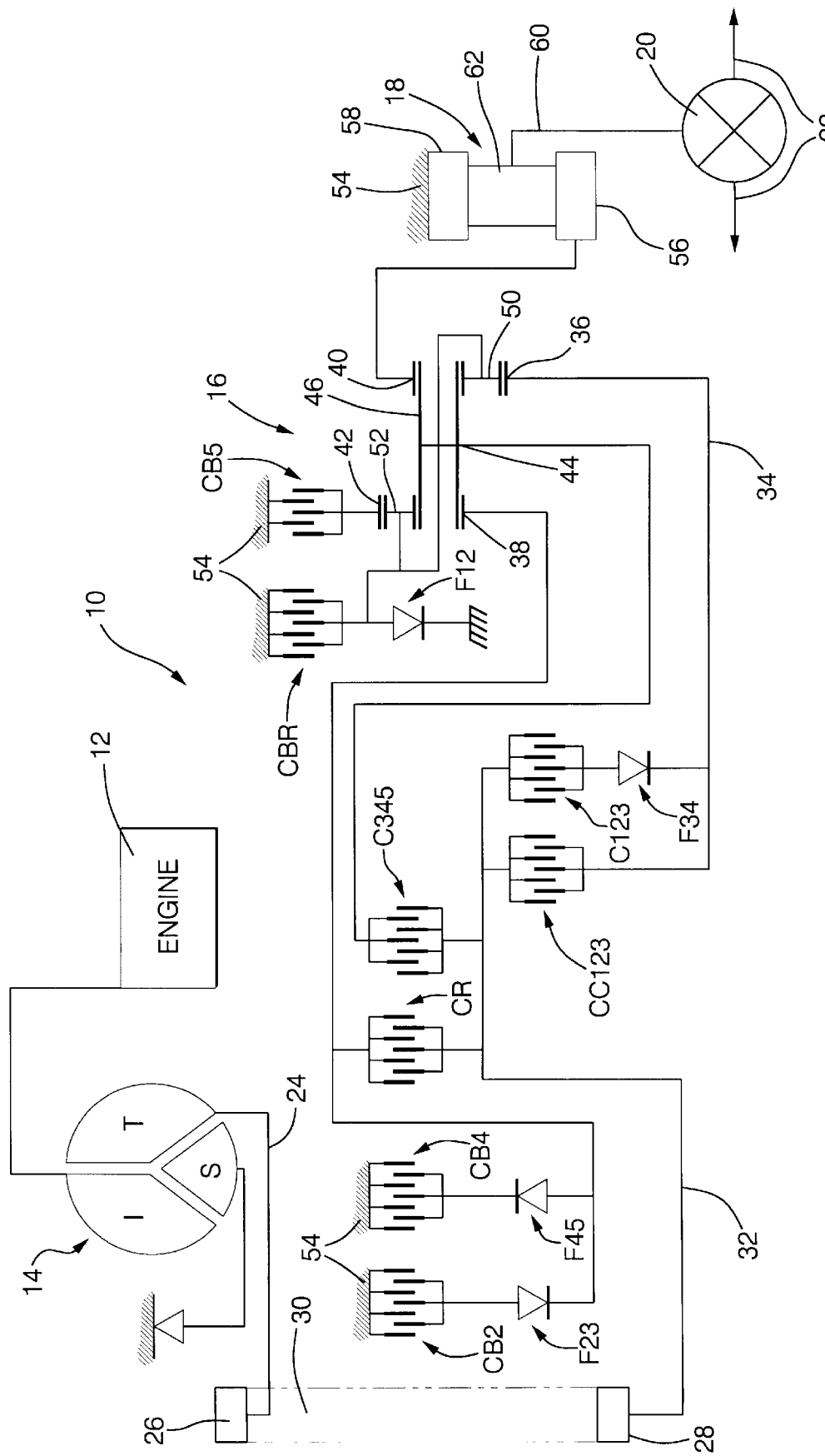
FIG. 4 is a schematic representation of a powertrain having a multi-speed transmission controlled by the hydraulic control of FIG. 1.

Referring to the drawings, and in particular, FIG. 4, there is seen a vehicle powertrain 10 having an engine 12, a torque converter 14, a planetary gear arrangement 16, a final drive planetary 18, and a differential gear 20. The differential gear 20 has a pair of output shafts 22 which are connected with vehicle drive wheels, not shown.

The engine 12, torque converter 14 and planetary gear arrangement 16 are conventional devices well known to those skilled in the art. The torque converter 14 has an impeller (I), a turbine (T) and a stator (S) connected in a well known toroidal fluid flow arrangement for transferring power from the engine 12 to a torque converter output shaft 24. The shaft 24 is connected to a sprocket 26 which, in turn, is connected to a sprocket 28 by a chain 30.

The sprocket 28 drives a transmission input shaft 32 which is drivingly connected for selectively engageable clutch mechanisms CC123, C123, C345 and CR. The clutch CC123 is connected through a one-way device F34 to a shaft 34.

The planetary gear arrangement 16 is a compound planetary gear arrangement including a pair of sun gears 36,38, a pair of ring gears 40,42, and a carrier assembly 44. The carrier assembly 44 includes a long pinion 46 which meshes with the sun gear 38 and ring gear 40, a short pinion 50 which meshes with the sun gear 36 and the long pinion 46, and a short pinion 52 which meshes with the long pinion 46 and the ring gear 42.

The planetary gear arrangement 16 can be constructed in accordance with U.S. Pat. No. 5,046,999 issued to Liu et al. on Sep. 10, 1991, and assigned to the assignee of the present application. A review of that patent will show that the planetary gear arrangement 16 with the friction devices shown will provide five forward speeds and one reverse speed.

The ring gear 42 is connected with a selectively engageable friction brake CB5, and the carrier assembly 44 is connected with both a selectively engageable friction brake CBR and a one-way device F12. The sun gear 38 is connected with a selectively engageable friction device CB2 and a one-way device F23 parallel in series therewith and also with a friction device CB4 and one-way device F45 in series therewith.

The friction brakes CB2 and CB4 are in parallel connection with a transmission case or housing 54. The friction devices are preferably hydraulically operated selectively engageable disc type devices which are well known in the art. Each of these devices has a fluid operated piston which is pressurized to enforce frictional engagement between the interlaced friction discs which make up the friction device.

The final drive 18 is a planetary gearset which includes a sun gear 56 connected with the ring gear 40, a ring gear 58 continuously connected with the transmission housing 54 and a carrier assembly 60 which is connected with the differential gear unit 20. The carrier assembly 60 has a plurality of pinion gears 62 rotatably mounted thereon and meshing with the sun gear 56 and ring gear 58.

As is well known with planetary gearsets, when the sun gear is driven and the ring gear is held stationary, the carrier will operate at a reduced speed relative to the sun gear. Thus, the final drive planetary 18 provides a reduction drive between the ring gear 40 of the planetary gear arrangement 16 and the differential gear 20.

The engagement of clutch C123 or clutch CC123 will establish a forward low speed within the planetary arrangement 16 through the aid of the one-way device F12. A ratio interchange from first to second is accomplished by the engagement of the brake CB2. A second to third ratio interchange is accomplished by the engagement of the clutch C345. A ratio change from third to fourth gear is accomplished by engagement of the brake CB4 and simultaneous disengagement of the clutch CC123 if it has been engaged which can occur in the intermediate drive range. The interchange from fourth gear to fifth gear is accomplished by engagement of the brake CB5.

It should be noted that the ratio interchanges occur through the assistance of the one-way devices F12, F23, F34 and F45. These devices permit the overrunning of the planetary gear components relative to their respective shafts whenever the transmission ratio commands it.

The controlling of the friction devices and the interchange thereof is established by an electro-hydraulic control 64 which includes a shift valve 66. The electro-hydraulic control 64 is a conventional electro-hydraulic device well known in the art which accepts signals from speed and torque sensors which recognize engine and vehicle speeds and torque input into the transmission. The electro-hydraulic control 64 also has an operator input or manual selector 68 which is effective to select a plurality of drive positions, and in particular, Park (P), Reverse (R), Neutral (N), Forward Drive (D). Forward Drive (D) establishes a system in which automatic shifting of first through fifth gears will occur. The selector 68 is also selectable at positions 4, 3 and 2. During these latter three positions, the transmission will have dynamic engine braking available and the ratio interchanges on upshifts will be delayed considerably relative to the normal shift pattern in Drive (D).

The shift valve 66 has upper and lower valve body components 70 and 72 which cooperate to form a cavity or recess 74 in which a valve disc or plate 76 is rotatably disposed. The valve disc 76 is controlled in rotation within the recess 74 by a conventional electric stepper motor 78 which receives electrical signals from the electro-hydraulic control as generated by the sensors within the transmission engine. The stepper motor 78 will rotate the valve disc 76 to five operating conditions representing the ratios first through fifth. The upper and lower valve bodies 70,72 have a plurality of openings formed therein including a central passage 80, a CB5 passage 82, a CB4 passage 86, a D2 passage 88, a C345 passage 90, a CC123 passage 92, a D3 passage 94, a D4 passage 96 and a CB2 passage 98.

The stepper motor 78 can also be powered by hydraulics or pneumatics. Fluid motors operating with these power mediums are well known. The disc 76 can also be rotated to sequential positions by any of the well known rotary input devices, such as solenoids or servo-motors.

The D4 passage 96 connects to two passages in the upper and lower valve bodies 70,72. These passages within the valve body 70,72 communicate with the recess 74. However, the passages may be blocked by the valve disc 76. The electro-hydraulic control 64 also supplies fluid pressure through a DR passage 100 to the central passage 80.

Also communicating with the electro-hydraulic control 64 is a clutch passage 102 connecting with clutch CC 123, a passage 104 connecting with brake CBR and a passage 106 connecting with clutch CR. When the respective passages 80 through 106 are pressurized, the respective clutches and brakes connected therewith will also be pressurized.

The valve disc 76 has a central passage 108 which communicate through a plurality of radial passages 110, 112 and 114 with axial passages formed within the valve disc 76. The radial passage 110 communicates with radial passages 110A, 110B, 110C and 110D. The radial passage 112 communicates with axial passages 112A, 112B and 112C. The radial passage 114 connects with axial passage 114A.

The valve disc 76 has an outer diameter 116 which is smaller than diameter 118 of the recess 74. The space between the diameter 116 and diameter 118 is connected to exhaust passages 120. Therefore, the entire outer periphery of the valve disc 76 is connected with exhaust.

The valve disc 76 has exhaust passages 122, 124, 126, 128, 130 and 132 which communicate with the space between the diameter 116 and the diameter 118. Each of these exhaust passages 122 through 126 has one or more axially extending exhaust passages connected therewith. These exhaust passages are given the same basic numerical designation with a alpha suffix, for example, exhaust passage 122 has radial passages 122A, 122B, 122C and 122D.

The valve disc 76 also has a plurality of interconnecting radial and circumferential passages disposed to interconnect with axial fluid passages. For example, passage 134 interconnects passages 136 and 138; passage 140 interconnects passages 142 and 144; passage 146 interconnects passages 148 and 150, while passage 152 interconnects passages 154 and 156.

In the first forward range, all of the passages directed by the shift valve 66 to the various clutches and brakes are connected with exhaust since only the clutch C123, which is connected to passage 102, needs to be engaged for the first forward gear when the Drive (D) ratio range is selected. For example, CB2 is exhausted at 122, CC123 is exhausted at 124, C345 is exhausted at 126, CB4 is exhausted at 128, CB5 is exhausted at 130. CBR and CR are exhausted at the manual control valve in the electro-hydraulic control 64. Also, during the Drive (D) selection, the central passage 108 is pressurized by the central passage 80. In fact, in all drive ranges, the central passage 108 is pressurized from the electro-hydraulic control 64 via passage 100 and central passage 80.

When the valve disc 76 is rotated to assume the ratio interchange from first to second and therefore the second ratio position is accomplished, the CB2 passage 98 is connected with axial passage 110A and therefore receives system pressure from the central passage 108. The remaining clutches and brakes are exhausted. On the ratio change from second to third, the passage 98 connected with CB2 remains pressurized through the alignment of axial passage 112A with the CB2 port. The C345 passage 90 is connected with the central passage 108 through radial axial passage 110B. Therefore, in third ratio, both CB2 and CC345 are engaged. As previously mentioned, C123 is also engaged from the electro-hydraulic control 64. In the third forward ratio in the "D" range, the other devices are exhausted.

When the valve disc 76 is rotated to the fourth forward ratio in the "D" range, the clutch C345 remains pressurized by alignment with the axial passage 112B, the CB4 passage 86 is pressurized via alignment with the axial passage 110C and the brake CB2 is exhausted through the combination of passages 152, 154 and 156. In this position, the axial passage 154 is connected with CB2 while the axial passage 156 is connected with passage 96 which is pressurized through the electro-hydraulic control 64 in drives D2, D3, D4. In fourth ratio forward, the clutch passage 92 for CC123 is exhausted through exhaust passage 130.

In the fifth and highest forward range, the passage 82 and therefore CB5 is pressurized from the central passage 108 through axial passage 110D. C345 remains engaged through axial passage 114 and brake CB4 remains engaged through axial passage 112C and passage 86. Therefore, it should be apparent that each of the drive ratios can be established and interchanged by simple rotation of the valve disc 76.

It should also be apparent to those skilled in the art that at various driving conditions, it is desirable to establish engine coast braking by manipulating the manual shift selector 68 to the drive conditions 2, 3 and 4. In the lowest drive position or "2", the passage 88 is pressurized and when the valve disc 76 rotates to the second gear position, the passage 92 which communicates with clutch CC123 is pressurized through the cooperation of passages 146, 148 and 150. CB4 is pressurized from passage 88 through passages 134, 136, 138.

During the third ratio, when shift position "3" has been selected, the clutch passage 90 directed to C345 is pressurized as previously described, while the clutch passage 92 directed to clutch CC123 is pressurized by the interaction of passages 140, 142 and 144. Also, the brake CB4 is exhausted through the interaction of passages 122–122C.

When drive position "4" is selected, the brake CB4 is pressurized via passage 86 as previously explained. However, the brake CB2 of passage 98 is also pressurized through the cooperation of passage 96, passages 152, 154 and 156 and passage 98.

During selection of the drive "2" range, the passages 94 and 96 are also pressurized such that on upshifts from second to third and third to fourth, the engine coast braking will be available. When the drive "3" range is selected, the passage 96 is also pressurized such that during an upshift from third to fourth, the dynamic braking will remain available. As previously noted, these upshifts occur at much higher vehicle speeds than would normally be available with the shift pattern established in Drive (D). However, it is desirable that the engine braking be maintained since that was the operator's selection when something other than Drive (D) was selected.

The valve disc 76 is positioned in the valve body cavity 74, such that an axis 160 is aligned with an axis 162 when the transmission is in the first ratio. The axis 160 is aligned with axes 164, 166, 168 and 170 when the drive ranges D2, D3, D4 and DR, respectively, are appropriate for the vehicle operation requested by the operator.

I claim:

1. A transmission control in a transmission having a plurality of fluid operated friction devices for selectively establishing a plurality of forward drive ratios sequentially from a low ratio to a high ratio with at least two intermediate ratios, said control comprising:

a valve body having a recess and a plurality of pressure ports communication individually with a plurality of pressure sources and said friction devices, each pressure port communication with said recess;

a valve disc rotatably disposed in said recess having a plurality of combinations of radial, circumferential and axial passages interconnected to direct fluid pressure from said sources to selected ones of the friction devices dependent upon the rotational position of the valve disc within the valve body recess, one combination of radial, circumferential and axial passages being effective to sequentially engage the friction devices upon rotation of said valve disc from one rotational position to the next to sequentially establish the drive ratios from the low ratio, through the intermediate ration to the high ratio; and means for rotating said valve disc to the rotational positions.

2. The transmission control defined in claim 1 wherein said valve disc is rotatable at least four forward drive positions and wherein at least one fluid pressure source is communicated to said valve disc during all of the forward drive positions.

3. The transmission control defined in claim 1 further comprising:

the transmission having three intermediate drive ratios and upon a first of the intermediate drive ratios being selected, four pressure sources of said plurality of pressure sources are communicated to said valve body and upon a second of the intermediate drive ratios being selected, three pressure sources of said plurality of pressure sources are communicated to said valve body for distribution.

* * * * *